United States Patent
Huang et al.

(10) Patent No.: US 12,305,001 B2
(45) Date of Patent: May 20, 2025

(54) MODIFIED POLYAMIDE, METHOD OF PREPARING THE SAME, AND SINGLE COMPONENT FIBER

(71) Applicant: TAIWAN TEXTILE RESEARCH INSTITUTE, New Taipei (TW)

(72) Inventors: Po-Hsun Huang, New Taipei (TW); Wei-Hsiang Lin, New Taipei (TW); Ta Ko, New Taipei (TW); Wei-Peng Lin, New Taipei (TW)

(73) Assignee: TAIWAN TEXTILE RESEARCH INSTITUTE, New Taipei (TW)

( * ) Notice: Subject to any disclaimer, the term of this patent is extended or adjusted under 35 U.S.C. 154(b) by 341 days.

(21) Appl. No.: 17/158,060

(22) Filed: Jan. 26, 2021

(65) Prior Publication Data

US 2021/0332187 A1    Oct. 28, 2021

(30) Foreign Application Priority Data

Apr. 27, 2020    (TW) .................. 109114053

(51) Int. Cl.
  *C08G 69/40*    (2006.01)
  *C08G 69/36*    (2006.01)
  *D01F 6/80*    (2006.01)

(52) U.S. Cl.
  CPC ............. *C08G 69/40* (2013.01); *C08G 69/36* (2013.01); *D01F 6/80* (2013.01)

(58) Field of Classification Search
  None
  See application file for complete search history.

(56) References Cited

U.S. PATENT DOCUMENTS

| | | |
|---|---|---|
| 5,306,761 A | 4/1994 | Ohwaki et al. |
| 5,922,830 A | 7/1999 | Kinoshita et al. |
| 8,153,253 B2 | 4/2012 | Yoshimoto et al. |
| 2010/0282411 A1* | 11/2010 | Nataniel .............. C08G 69/265 |
| | | 528/335 |
| 2019/0367672 A1 | 12/2019 | Grassi et al. |

FOREIGN PATENT DOCUMENTS

| | | | |
|---|---|---|---|
| CN | 108203509 A | * 6/2018 | ............. C08G 69/36 |
| CN | 110382595 A | 10/2019 | |
| EP | 2235089 A2 | 10/2010 | |

(Continued)

OTHER PUBLICATIONS

Machine translation for CN 108203509A (Year: NA).*

(Continued)

*Primary Examiner* — Rachel Kahn
(74) *Attorney, Agent, or Firm* — McClure, Qualey & Rodack, LLP

(57) ABSTRACT

A modified polyamide is provided, which has a structure of formula (1), in which a+c is 3-8, b is 8-40, m is 3-11, n is 2-16, x is 100-220, and y is 1-6. A method of preparing a modified polyamide is also provided, which includes copolymerizing C4-C12 lactam, C4-C18 linear aliphatic dicarboxylic acid, polyetherdiamine, and diethylenetriamine (DETA), in which the lactam is 80 to 95 parts by weight, and the linear aliphatic dicarboxylic acid is 1 to 4 parts by weight, and the polyetherdiamine is 4 to 16 parts by weight, and the diethylenetriamine is 0.2 to 0.6 parts by weight.

5 Claims, 1 Drawing Sheet formula (I)

(56) References Cited

FOREIGN PATENT DOCUMENTS

| | | | |
|---|---|---|---|
| EP | 2886687 A1 | | 6/2015 |
| KR | 2002053158 A | * | 7/2002 |
| TW | I439589 B | | 6/2014 |
| TW | I516651 B | | 1/2016 |
| TW | 201615750 A | | 5/2016 |
| TW | I542746 B | | 7/2016 |
| TW | 201823536 A | | 7/2018 |
| TW | 201943902 A | | 11/2019 |
| TW | 202024182 A | | 7/2020 |
| WO | WO-2018146581 A1 | * | 8/2018 ............. C08G 69/14 |

OTHER PUBLICATIONS

Machine translations of KR20020053158A (Google and KIPO) (Year: NA).*
Machine translation of CN 108203509A, generated from espacenet (Year: NA) (Year: NA).*

* cited by examiner

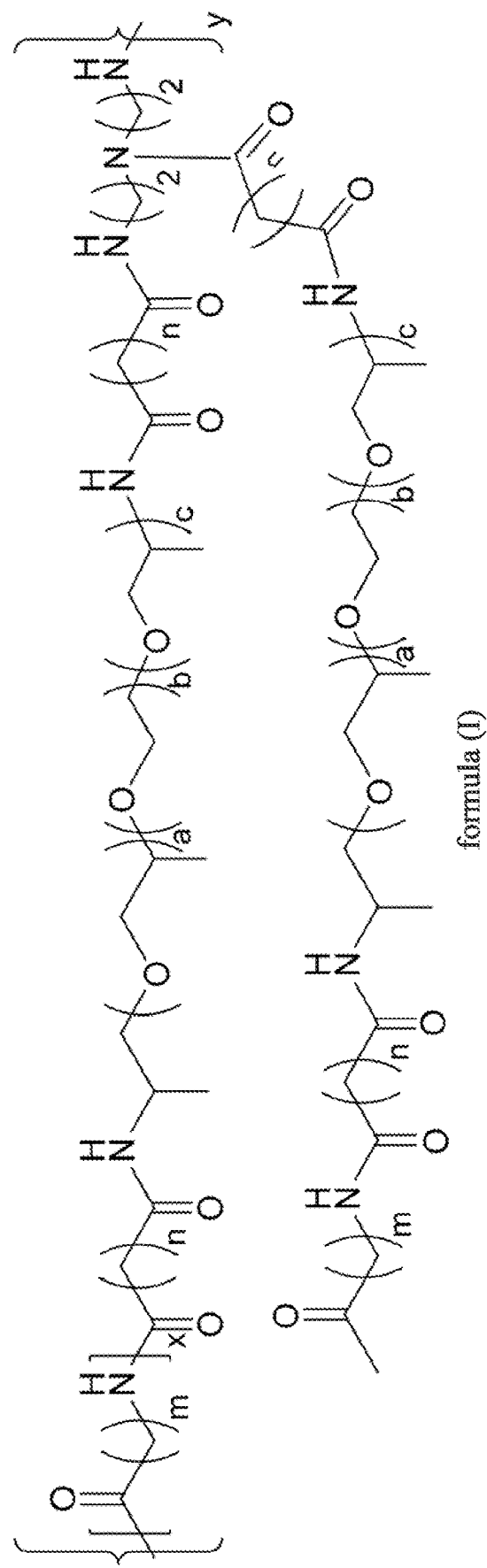
formula (I)

MODIFIED POLYAMIDE, METHOD OF PREPARING THE SAME, AND SINGLE COMPONENT FIBER

CROSS-REFERENCE TO RELATED APPLICATION

This application claims priority to Taiwan Application Serial Number 109114053, filed Apr. 27, 2020, which is herein incorporated by reference.

BACKGROUND

Field of Invention

The present invention relates to a modified polyamide, a method of preparing the same, and a single component fiber. In particular, it relates to a modified polyamide formed by copolymerizing lactam, linear aliphatic dicarboxylic acid, polyetherdiamine, and diethylenetriamine, and a method of preparing the same, as well as a single component fiber composed of the modified polyamide.

Description of Related Art

Since the advent of nylon fiber, it has been widely used in various fabrics, clothing and medical supplies due to its advantages of toughness, wear resistance, smoothness, light weight, and low static electricity generation. However, the conventional nylon fiber cannot meet requirements of various product characteristics. Therefore, there is a need to develop other polyamides that can be used to make nylon fibers, which can exhibit the characteristics on fibers and fabrics, so as to meet the current needs for products.

SUMMARY

The present invention provides a modified polyamide having a structure of formula (I), in which a+c is 3-8, b is 8-40, m is 3-11, n is 2-16, x is 100-220, and y is 1-6.

The present invention provides a single component fiber composed of the aforementioned modified polyamide.

The present invention provides a method of preparing a modified polyamide, which includes copolymerizing C4-C12 lactam, C4-C18 linear aliphatic dicarboxylic acid, polyetherdiamine and diethylenetriamine (DETA), in which the lactam is 80 to 95 parts by weight, and the linear aliphatic dicarboxylic acid is 1 to 4 parts by weight, and the polyetherdiamine is 4 to 16 parts by weight, and the diethylenetriamine is 0.2 to 0.6 parts by weight.

In some embodiments, the diethylenetriamine is 0.2 wt % to 0.6 wt % base on a total weight of the lactam, the linear aliphatic dicarboxylic acid, the polyetherdiamine, and the diethylenetriamine.

In some embodiments, the polyetherdiamine is 4 wt % to 16 wt % based on a total weight of the lactam, the linear aliphatic dicarboxylic acid, the polyetherdiamine, and the diethylenetriamine.

In some embodiments, the polyetherdiamine has a structure of formula (II):

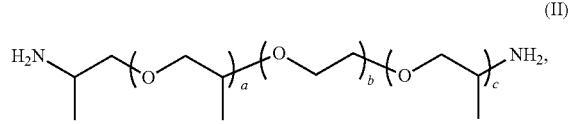

in which a+c is 3-8, and b is 8-40.

In some embodiments, an average molecular weight of the polyetherdiamine is in a range of from 600 to 2,200.

In some embodiments, copolymerizing the lactam, the linear aliphatic dicarboxylic acid, the polyetherdiamine, and the diethylenetriamine is performed at a temperature of 200° C. to 270° C. and an absolute pressure of 0.1 bar to 3 bar.

The present invention provides a single component fiber including a modified polyamide formed by copolymerizing C4-C12 lactam, C4-C18 linear aliphatic dicarboxylic acid, polyetherdiamine, and diethylenetriamine.

In some embodiments, the polyetherdiamine has a structure of formula (II):

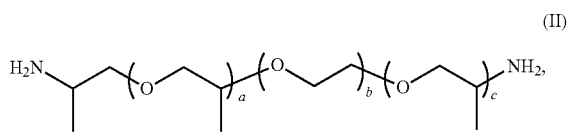

in which a+c is 3-8, and b is 8-40.

BRIEF DESCRIPTION OF THE DRAWINGS

The disclosure can be more fully understood by reading the following detailed description of the embodiments, with reference made to the accompanying drawings as follows:

FIG. 1 is a chemical formula that shows "formula (1)" as that term is used throughout this disclosure.

DETAILED DESCRIPTION

A variety of different embodiments and experimental examples of the present invention are provided below to realize various technical features of the present invention. The following specific experimental examples are only examples, and are not intended to limit the present invention. In addition, the present invention may use repeated terms in each embodiment, but it is not used to limit the relationship between the various embodiments.

The present invention provides a method of preparing a modified polyamide, in which C4-C12 lactam, C4-C18 linear aliphatic dicarboxylic acid, polyetherdiamine, and diethylenetriamine (DETA) acted as reactants undergo copolymerization to form the modified polyamide. During the copolymerization reaction, these reactants will be bonded to each other via amide bonds (—NHCO—).

The properties of the modified polyamide may be adjusted by adjusting a weight ratio between the reactants. In one embodiment, the lactam is 80 to 95 parts by weight, and the linear aliphatic dicarboxylic acid is 1 to 4 parts by weight, and the polyetherdiamine is 4 to 16 parts by weight, and the diethylenetriamine is 0.2 to 0.6 parts by weight.

The properties of the modified polyamide may be adjusted by selecting different types of the reactants. In one embodiment, the lactam is caprolactam (CPL) with 6 carbons, and the linear aliphatic dicarboxylic acid is adipic acid (AA) with 6 carbons.

In one embodiment, the polyetherdiamine is 4 wt % to 16 wt % based on a total weight of the lactam, the linear aliphatic dicarboxylic acid, the polyetherdiamine, and the diethylenetriamine. In one embodiment, the polyetherdiamine is 5 wt % to 15 wt % based on the total weight of the lactam, the linear aliphatic dicarboxylic acid, the polyetherdiamine, and the diethylenetriamine.

In one embodiment, the polyetherdiamine has a structure of formula (II):

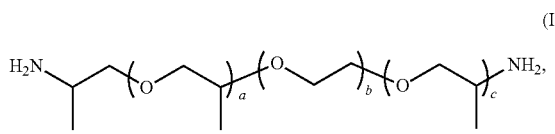

in which a+c is 3-8, and b is 8-40. In one embodiment, an average molecular weight of the polyetherdiamine is in a range of from 600 to 2,200. It is worth noting that because the polyetherdiamine has good hydrophilicity, the ether group thereof easily forms hydrogen bonds with water molecules, so the modified polyamide has good moisture absorption property. In addition, the polyetherdiamine may also provide the modified polyamide with good flexibility.

In one embodiment, the diethylenetriamine is 0.2 wt % to 0.6 wt % base on the total weight of the lactam, the linear aliphatic dicarboxylic acid, the polyetherdiamine, and the diethylenetriamine. In one embodiment, the diethylenetriamine is 0.25 wt % to 0.55 wt % base on the total weight of the lactam, the linear aliphatic dicarboxylic acid, the polyetherdiamine, and the diethylenetriamine. The diethylenetriamine has three amine groups, which are two primary amine groups (—NH$_2$) and one secondary amine group (—NH). The primary amine groups can react with a carboxylic acid group (—COOH) of the linear aliphatic dicarboxylic acid to form the amide bond. The secondary amine group can form a covalent bond with a carboxylic acid group of the linear aliphatic dicarboxylic acid to form a micro-crosslinked structure. The micro-crosslinked structure has good fluidity and elasticity, and thus it can make the modified polyamide have good shrinkage recovery property. In addition, since the three amine groups of the diethylenetriamine are hydrophilic, it helps to increase the moisture absorption property of the modified polyamide.

In one embodiment, copolymerizing the lactam, the linear aliphatic dicarboxylic acid, the polyetherdiamine, and the diethylenetriamine is performed at a temperature of 200° C. to 270° C. and an absolute pressure of 0.1 bar to 3 bar to form the modified polyamide. In one embodiment, the lactam, the linear aliphatic dicarboxylic acid, the polyetherdiamine, and the diethylenetriamine are mixed at normal temperature and pressure, and then the temperature is increased to 200-240° C. and the pressure is increased to 1.2-3 bar for 1 to 2.5 hours, so that the lactam performs a hydrolysis reaction. Subsequently, the temperature is raised to 240-270° C., and the pressure is then released to normal pressure or close to normal pressure to remove water, and then vacuumed to 0.1-0.5 bar to make the hydrolyzed lactam, linear aliphatic dicarboxylic acid, the polyetherdiamine, and the diethylenetriamine undergo the copolymerization reaction to form the modified polyamide. In one embodiment, when a torsion value of the modified polyamide increases to a specific range due to the increasing in the degree of polymerization, the modified polyamide is pelletized to form modified polyamide masterbatches.

The present invention provides a modified polyamide, which has a structure of formula (I) provided in FIG. 1, in which a+c is 3-8, b is 8-40, m is 3-11, n is 2-16, x is 100-220, and y is 1-. In this regard, "formula (1)" is expressly defined to mean the formula shown in FIG. 1.

The present invention also provides a single component fiber, which is composed of the modified polyamide having the structure of formula (I) as mentioned.

The present invention also provides a single component fiber including a modified polyamide formed by copolymerizing C4-C12 lactam, C4-C18 linear aliphatic dicarboxylic acid, polyetherdiamine, and diethylenetriamine. In one embodiment, the polyetherdiamine has a structure of formula (II):

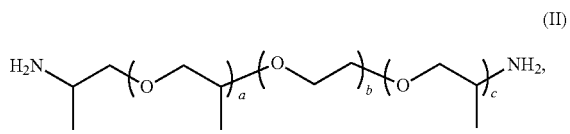

in which a+c is 3-8, and b is 8-40.

The aforementioned single component fibers have both good moisture absorption elongation property and drying shrinkage recovery property. Specifically, the single component fibers elongate under a higher humidity environment, and shrink and recover under a lower humidity environment. Fabrics made from the aforementioned single component fibers also have good moisture absorption property and durable elongation recovery property.

Recently, in order to make fabrics have both moisture absorption elongation property and drying shrinkage recovery property, the industry mostly uses two different materials to make a bi-component composite fiber, and the most common of which are sheath-core and side-by-side bi-component composite fibers. For example, the sheath-core bi-component composite fiber and the side-by-side bi-component composite fiber have stretching and shrinking effects due to different elongation rates of two components after moisture absorption.

However, in the present invention, the single component fiber prepared by the aforementioned modified polyamide can have good moisture absorption elongation property and drying shrinkage recovery property simultaneously, so there is no need to combine with other materials (e.g., conventional polyester or conventional polyamide, etc.) to make the bi-component composite fiber. Therefore, compared with the bi-component composite fiber, a process of fabricating the single component fiber of the present invention is simpler and easier to recycle and has advantages in manufacturing cost and environmental protection.

The following experimental examples are used to describe specific aspects of the present invention, and enable those with ordinary skill in the art of the present invention to implement the present invention. However, the following experimental examples are not intended to limit the present invention.

<Preparation for Modified Polyamide>

In Comparative Example 1, 100 wt % of caprolactam (CPL) was polymerized to form Nylon 6. In Experimental Examples 1 to 6, caprolactam, adipic acid (AA), polyetherdiamine having the structure of formula (II) (molecular weight approximately 900), and diethylenetriamine (DETA) with different ratios were copolymerized to form modified polyamides. Please refer to Table 1 for the weight percent concentrations of the reactants and the relative viscosities and the melting points of the products in Comparative Example 1 and Experimental Examples 1 to 6.

TABLE 1

| | CPL (wt %) | AA (wt %) | Polyether-diamine (wt %) | DETA (wt %) | Relative viscosity (R.V.) | Melting point (° C.) |
|---|---|---|---|---|---|---|
| Comparative Example 1 | 100 | 0 | 0 | 0 | 2.4 | 225.2 |
| Experimental Example 1 | 93.5 | 1.2 | 5 | 0.3 | 1.91 | 217.6 |
| Experimental Example 2 | 87.7 | 2.0 | 10 | 0.3 | 1.57 | 214.0 |
| Experimental Example 3 | 81.9 | 2.8 | 15 | 0.3 | 1.49 | 212.5 |
| Experimental Example 4 | 93.0 | 1.5 | 5 | 0.5 | 1.92 | 221.9 |
| Experimental Example 5 | 87.2 | 2.3 | 10 | 0.5 | 1.62 | 216.3 |
| Experimental Example 6 | 81.4 | 3.1 | 15 | 0.5 | 1.51 | 213.3 |

It could be seen from Table 1 that the melting points of Comparative Example 1 and Experimental Examples 1 to 6 were in a range of from 212° C. to 226° C., and the relative viscosities thereof were in a range of from 1.4 to 2.4, which proved that the modified polyamides of the present invention can meet requirements of material characteristics of the general spinning process.

In addition, from Experimental examples 1 to 3 and 4 to 6 in Table 1, it could be seen that as the content of polyetherdiamine increased, the proportion of flexible segments increased, so as to make the modified polyamide less easy to arrange to form ordered crystalline, and accordingly the relative viscosities and the melting points of the modified polyamides decreased.

<Test for Saturated Water Absorption Rate>

The products of Comparative Example 1 and Experimental Examples 1 to 6 were tested for saturated water absorption rate.

First, about 5 g of products were weighted and placed in an oven at 105° C. to dry for 24 hours and then weighted ($W_1$). Subsequently, the products were put into cold water for 8 hours and then taken out and weighted ($W_2$). The saturated water absorption (%)=$(W_2-W_1)/W_1 \times 100\%$ of each example was measured. Please refer to Table 2 for test results of the saturated water absorption rates of Comparative Example 1 and Experimental Examples 1 to 6.

TABLE 2

| | Polyetherdiamine (wt %) | DETA (wt %) | Saturated water absorption rate (%) |
|---|---|---|---|
| Comparative Example 1 | 0 | 0 | 4 |
| Experimental Example 1 | 5 | 0.3 | 6 |
| Experimental Example 2 | 10 | 0.3 | 12 |
| Experimental Example 3 | 15 | 0.3 | 18 |
| Experimental Example 4 | 5 | 0.5 | 10 |
| Experimental Example 5 | 10 | 0.5 | 18 |
| Experimental Example 6 | 15 | 0.5 | 25 |

From Experimental examples 1 to 3 and 4 to 6 in Table 2, it could be seen that as the content of polyetherdiamine increased, the saturated water absorption rate of the modified polyamide significantly increased. From Experimental examples 1 and 4, 2 and 5, or 3 and 6 in Table 2, it could be seen that diethylenetriamine also helps to increase the saturated water absorption rate of the modified polyamide.

<Tests for Moisture Absorption Elongation Rate and Drying Recovery Rate of Fiber>

Comparative Example 1 and the modified polyamides of Experimental Examples 1 to 6 were spun at an output of 70d/48f SDY, a spinning speed of 2500 m/min, and a heating temperature between 260° C. and 280° C. to form single component fibers, and tests for the moisture absorption elongation rate and the drying recovery rate of the fibers were then performed.

The test methods of the moisture absorption elongation rate and the drying recovery rate of the fibers are as follows. First, the fiber (70d/48f) was put in boiling water for 30 minutes with a load of about 0.5 g to about 1 g to be cleaned, and the fiber was then taken out and placed in an environment with a temperature of 20° C. and a humidity of 65% (i.e. a standard environment) for 24 hours, and the fiber had an initial length ($L_0$) with a load of about 0.5 g under the standard environment.

The fiber was then placed in an oven at 105° C. to be dried to obtain an absolutely dry length ($L_1$) of the fiber.

The fiber was then placed in an environment with a temperature of 30° C. and a humidity of 90% (i.e., a high-humidity environment) to allow it to absorb moisture and elongate, and the fiber after moisture absorption had a length ($L_2$). The moisture absorption elongation rate (%)=$100\% \times$(length after moisture absorption $L_2$–absolutely dry length $L_1$)/absolutely dry length $L_1$ of each example was measured.

The fiber was then placed back in the environment with the temperature of 20° C. and the humidity of 65% to be dried, and the fiber after shrinkage and recovery had a length (Ls). The drying recovery rate (%)=$100\%-100\%\times[$(length after shrinkage and recovery $L_3$–initial length $L_0$)/initial length $L_0]$ of each example was measured.

Five fibers of each of Comparative Example 1 and Experimental Examples 1 to 3 were taken to perform the aforementioned tests for the moisture absorption elongation rate and the drying recovery rate. For the results, please refer to Table 3.

TABLE 3

| | Moisture absorption elongation rate (%) | | | | |
|---|---|---|---|---|---|
| | No. 1 | No. 2 | No. 3 | No. 4 | No. 5 |
| Comparative Example 1 | 8 | 7 | 6 | 5 | 6 |
| Experimental Example 1 | 8 | 7 | 8 | 9 | 9 |
| Experimental Example 2 | 12 | 11 | 13 | 11 | 12 |
| Experimental Example 3 | 16 | 16 | 16 | 15 | 16 |
| | Drying recovery rate (%) | | | | |
| | No. 1 | No. 2 | No. 3 | No. 4 | No. 5 |
| Comparative Example 1 | 99.0 | 99.3 | 99.5 | 99.3 | 98.8 |
| Experimental Example 1 | 95.8 | 96.4 | 95.8 | 96.1 | 95.9 |
| Experimental Example 2 | 96.1 | 96.7 | 95.5 | 95.8 | 96.4 |
| Experimental Example 3 | 94.5 | 94.5 | 95.7 | 95.4 | 94.5 |

It could be seen from Table 3 that as the content of polyetherdiamine increased, the proportion of flexible segments and the hydrophilicity of the modified polyamide increased, and accordingly the moisture absorption elongation rate of the modified polyamide increased.

In addition, five fibers of each of Comparative Example and Experimental Examples 4 to 6 were taken to perform the aforementioned tests for the moisture absorption elongation rate and the drying recovery rate. For the results, please refer to Table 4.

TABLE 4

| | Moisture absorption elongation rate (%) | | | | |
| --- | --- | --- | --- | --- | --- |
| | No. 1 | No. 2 | No. 3 | No. 4 | No. 5 |
| Comparative Example 1 | 6 | 6 | 6 | 6 | 6 |
| Experimental Example 4 | 6 | 9 | 9 | 5 | 9 |
| Experimental Example 5 | 14 | 14 | 15 | 14 | 13 |
| Experimental Example 6 | 19 | 16 | 17 | 16 | 17 |

| | Drying recovery rate (%) | | | | |
| --- | --- | --- | --- | --- | --- |
| | No. 1 | No. 2 | No. 3 | No. 4 | No. 5 |
| Comparative Example 1 | 97.3 | 97.1 | 97.6 | 99.5 | 99.8 |
| Experimental Example 4 | 97.2 | 97.2 | 96.4 | 96.9 | 97.2 |
| Experimental Example 5 | 97.5 | 97.8 | 97.5 | 97.0 | 97.3 |
| Experimental Example 6 | 96.3 | 95.7 | 96.9 | 97.6 | 97.9 |

It could be seen from Table 4 that as the content of polyetherdiamine increased, the proportion of flexible segments and the hydrophilicity of the modified polyamide increased, and accordingly the moisture absorption elongation rate of the modified polyamide increased.

In addition, compared with Experimental examples 1 to 3 in Table 3, the drying recovery rates of Experimental examples 4 to 6 were higher because the content of diethylenetriamine in Experimental examples 4 to 6 were higher.

<Physical Properties of Fiber>

Comparative Example 1 and the modified polyamides of Experimental Examples 1 to 6 were spun at an output of 70d/48f SDY, a spinning speed of 2500 m/min, and a heating temperature between 260° C. and 280° C. to form single component fibers. Tests for physical properties including strength, elongation rate and boiling water shrinkage rate of the fiber were then performed, and the results please refer to Table 5.

TABLE 5

| | Polyether-diamine (wt %) | DETA (wt %) | Strength (gf/d) | Elongation rate (%) | Boiling water shrinkage rate (%) |
| --- | --- | --- | --- | --- | --- |
| Comparative Example 1 | 0 | 0 | 4.16 | 43.1 | 13.4 |
| Experimental Example 1 | 5 | 0.3 | 3.38 | 51 | 16.4 |
| Experimental Example 2 | 10 | 0.3 | 3.14 | 54 | 19.3 |
| Experimental Example 3 | 15 | 0.3 | 3.12 | 47.3 | 26.3 |
| Experimental Example 4 | 5 | 0.5 | 2.65 | 75.3 | 16.6 |
| Experimental Example 5 | 10 | 0.5 | 2.90 | 67.6 | 22.6 |
| Experimental Example 6 | 15 | 0.5 | 2.89 | 67.7 | 26.7 |

It could be seen from Table 5 that the strengths of the modified polyamide fibers of Experimental Examples 1 to 6 could reach more than or equal to 2.5 gf/d, which can be used in post-processing or other processes.

<Test for Moisture Absorption Rate of Fabric>

The fibers prepared in Comparative Example 1 and Experimental Examples 1 to 6 were woven into socks respectively, and the test for moisture regain was performed to measure the moisture absorption rate.

First, the sock was placed in an oven at 105° C. to obtain a first weight $W_1$. Next, the sock was placed in an environment with a temperature of 20° C. and a humidity of 65% (i.e., a standard environment) for 24 hours to obtain a second weight $W_2$. Subsequently, the sock was placed in an environment with a temperature of 30° C. and a humidity of 90% (i.e., a high-humidity environment) for 24 hours to obtain a third weight $W_3$.

In this way, it could be calculated according to the following formula: moisture regain rate 1 (%)=100%×$(W_2-W_1)/W_1$; moisture regain rate 2 (%)=100%×$(W_3-W_1)/W_1$; moisture absorption rate=moisture regain rate 2-moisture regain rate 1.

For the test results of moisture regain rates 1, moisture regain rates 2, and moisture absorption rates of the socks of Comparative Example 1 and Experimental Examples 1 to 6, please refer to Table 6.

TABLE 6

| | Polyether-diamine (wt %) | DETA (wt %) | Moisture regain rate 1 (%) | Moisture regain rate 2 (%) | Moisture absorption rate (%) |
| --- | --- | --- | --- | --- | --- |
| Comparative Example 1 | 0 | 0 | 4.0 | 7.2 | 3.2 |
| Experimental Example 1 | 5 | 0.3 | 4.1 | 7.4 | 3.3 |
| Experimental Example 2 | 10 | 0.3 | 5.0 | 8.6 | 3.6 |
| Experimental Example 3 | 15 | 0.3 | 5.3 | 12.0 | 6.7 |
| Experimental Example 4 | 5 | 0.5 | 4.3 | 8.3 | 4.0 |
| Experimental Example 5 | 10 | 0.5 | 5.0 | 9.8 | 4.8 |
| Experimental Example 6 | 15 | 0.5 | 6.1 | 13.5 | 7.4 |

It could be seen from Table 6 that whether in the standard environment or the high-humidity environment, as the content of polyetherdiamine increased, the moisture regain rate 1, the moisture regain rate 2, and the moisture absorption rate all increased. The moisture absorption rate of Experimental Example 6 could be as high as 7.4%, which proves that the sock formed from the modified polyamide fibers had a good moisture absorption property.

The single component fiber formed from the modified polyamide of the present invention has good moisture absorption elongation property and drying shrinkage recovery property, and through the fabric structure design, the fabric can be deformed under different humidity to achieve air permeability variation. Therefore, the single component fiber prepared by the modified polyamide of the present invention can be used in functional outdoor and sports wears, close-fitting clothing, high-comfort operating clothing (e.g., operating clothing in the military and police fields or industrial and commercial fields) or fabrics that need humidity-sensing function.

For the functional outdoor and sports wears, the aforementioned modified polyamide fibers can be used with a fabric structure design in sweat-prone areas, such as the front chest, back and underarms. As such, the fabric can respectively activate the moisture absorption mechanism and the drying shrinkage recovery mechanism during the wearer's exercise period and the recovery period, so that the sweat-prone areas of the clothing have good moisture absorption property, reversibility of stretching, and air permeability.

It is obvious to those skilled in the art that various modifications and alternations can be made to the structure of the present invention without departing from the scope or spirit of the present invention. In view of the foregoing, the present invention is intended to cover the modifications and alternations of the present invention as long as they fall within the claim scope of the present invention.

What is claimed is:

1. A method of preparing a spin drawn yarn single component fiber, comprising:
    copolymerizing C4-C12 lactam, C4-C18 linear aliphatic dicarboxylic acid, polyetherdiamine, and diethylenetriamine (DETA) to form a modified polyamide, wherein the lactam is 80 to 95 parts by weight, and the linear aliphatic dicarboxylic acid is 1 to 4 parts by weight, and the polyetherdiamine is 4 to 16 parts by weight, and the diethylenetriamine is 0.2 to 0.6 parts by weight, wherein copolymerizing the C4-C12 lactam, the C4-C18 linear aliphatic dicarboxylic acid, the polyetherdiamine, and the diethylenetriamine comprises a first copolymerizing process and a second copolymerizing process, the first copolymerizing process is performed at a temperature of 200° C. to 240° C. and a pressure of 1.2 bar to 3 bar, and the second copolymerizing process is performed at a temperature of 240° C. to 270° C. and a pressure of 0.1 bar to 0.5 bar; and
    performing a spinning process on the modified polyamide with a spinning speed of 2500 m/min, and a heating temperature between 260° C. and 280° C. to form the spin drawn yarn single component fiber.

2. The method of claim 1, wherein the diethylenetriamine is 0.2 wt % to 0.6 wt % based on a total weight of the lactam, the linear aliphatic dicarboxylic acid, the polyetherdiamine, and the diethylenetriamine.

3. The method of claim 1, wherein the polyetherdiamine is 4 wt % to 16 wt % based on a total weight of the lactam, the linear aliphatic dicarboxylic acid, the polyetherdiamine, and the diethylenetriamine.

4. The method of claim 1, wherein the polyetherdiamine has a structure of formula (II):

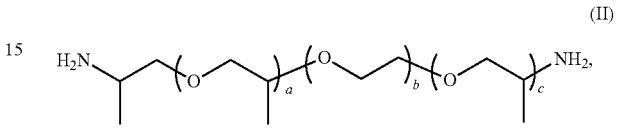

(II)

wherein a+c is 3-8, and b is 8-40.

5. The method of claim 1, wherein an average molecular weight of the polyetherdiamine is in a range of from 600 to 2,200.

* * * * *